US012639283B2

(12) United States Patent
Namous et al.

(10) Patent No.: US 12,639,283 B2
(45) Date of Patent: May 26, 2026

(54) AUTOMATED WIDGET PLACEMENT USING MACHINE LEARNING-BASED CONTEXTUAL ESTIMATION

(71) Applicant: Microsoft Technology Licensing, LLC, Redmond, WA (US)

(72) Inventors: Aboubakeur Namous, Jersey City, NJ (US); Raghavan Muthuregunathan, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 64 days.

(21) Appl. No.: 18/168,449

(22) Filed: Feb. 13, 2023

(65) Prior Publication Data
US 2024/0273078 A1 Aug. 15, 2024

(51) Int. Cl.
*G06F 16/23* (2019.01)

(52) U.S. Cl.
CPC .................................... *G06F 16/23* (2019.01)

(58) Field of Classification Search
CPC ...................................................... G06F 16/23
See application file for complete search history.

(56) References Cited

U.S. PATENT DOCUMENTS

| | | | | |
|---|---|---|---|---|
| 10,073,589 B1* | 9/2018 | Jesensky | ............... | G06F 1/1694 |
| 10,089,654 B1* | 10/2018 | Chang | .................. | G06F 40/143 |
| 11,080,754 B1* | 8/2021 | Han | .................. | G06Q 30/0201 |

| | | | | |
|---|---|---|---|---|
| 2020/0137231 A1* | 4/2020 | Revanur | ............. | H04M 3/5175 |
| 2021/0142416 A1* | 5/2021 | Rajendran | .............. | G06Q 40/06 |
| 2022/0005464 A1* | 1/2022 | Shen | ...................... | G06N 3/044 |
| 2023/0045900 A1* | 2/2023 | Sabharwal | ............. | G06N 3/092 |
| 2023/0267719 A1* | 8/2023 | Parchami | .............. | G06V 10/82 |
| | | | | 382/156 |
| 2024/0104854 A1* | 3/2024 | Kwatra | ................... | G06F 3/011 |

OTHER PUBLICATIONS

"Decorator Pattern", Retrieved From: https://en.wikipedia.org/wiki/Decorator_pattern, Nov. 14, 2022, 26 Pages.
Chapelle, et al., "An Empirical Evaluation of Thompson Sampling", In Proceedings of 25th Annual Conference on Neural Information Processing Systems, Dec. 12, 2011, 9 Pages.
Robbins, et al., "Multi-armed Bandit", Retrieved From: https://en.wikipedia.org/wiki/Multi-armed_bandit, Nov. 27, 2022, 28 Pages.
Thompson, William R., "Thompson Sampling", Retrieved From: https://en.wikipedia.org/wiki/Thompson_sampling, Nov. 10, 2022, 7 Pages.

* cited by examiner

*Primary Examiner* — Ann J Lo
*Assistant Examiner* — Fatima P Mina
(74) *Attorney, Agent, or Firm* — NICHOLSON DE VOS WEBSTER & ELLIOTT LLP

(57) ABSTRACT

Methods, systems, and apparatuses include receiving query data. Contextual data is generated based on the received query data. Feature vectors are generated for a new widget based on the query data and contextual data. A widget ranking model is configured using the feature vectors. The configured widget ranking model is applied to a plurality of widgets. The new widget is assigned to a widget slot using an output of the configured widget ranking model. Reward data is received from a graphical user interface in response to presentation of the new widget in the assigned widget slot. The configured widget ranking model is updated based on the reward data.

15 Claims, 7 Drawing Sheets

FIG. 1
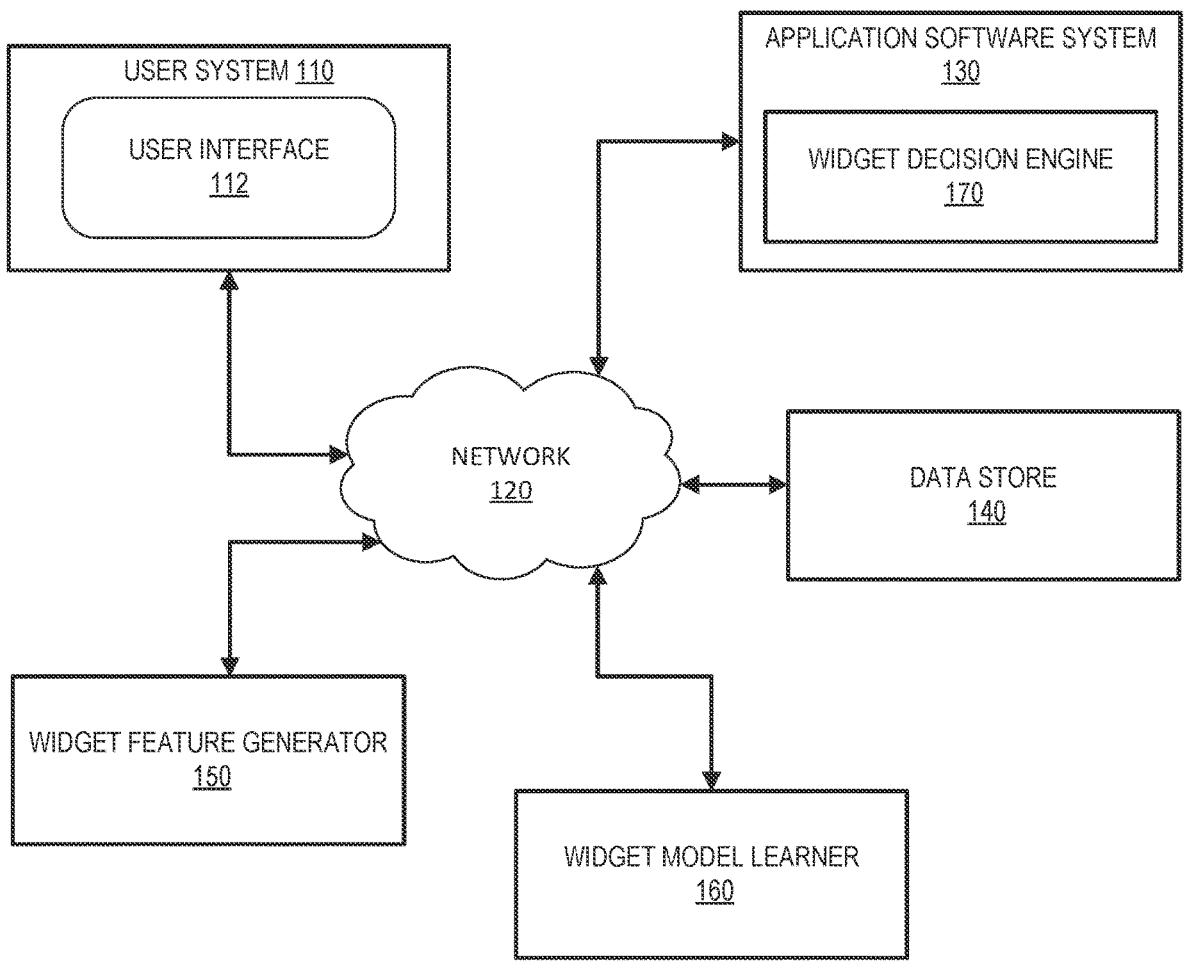

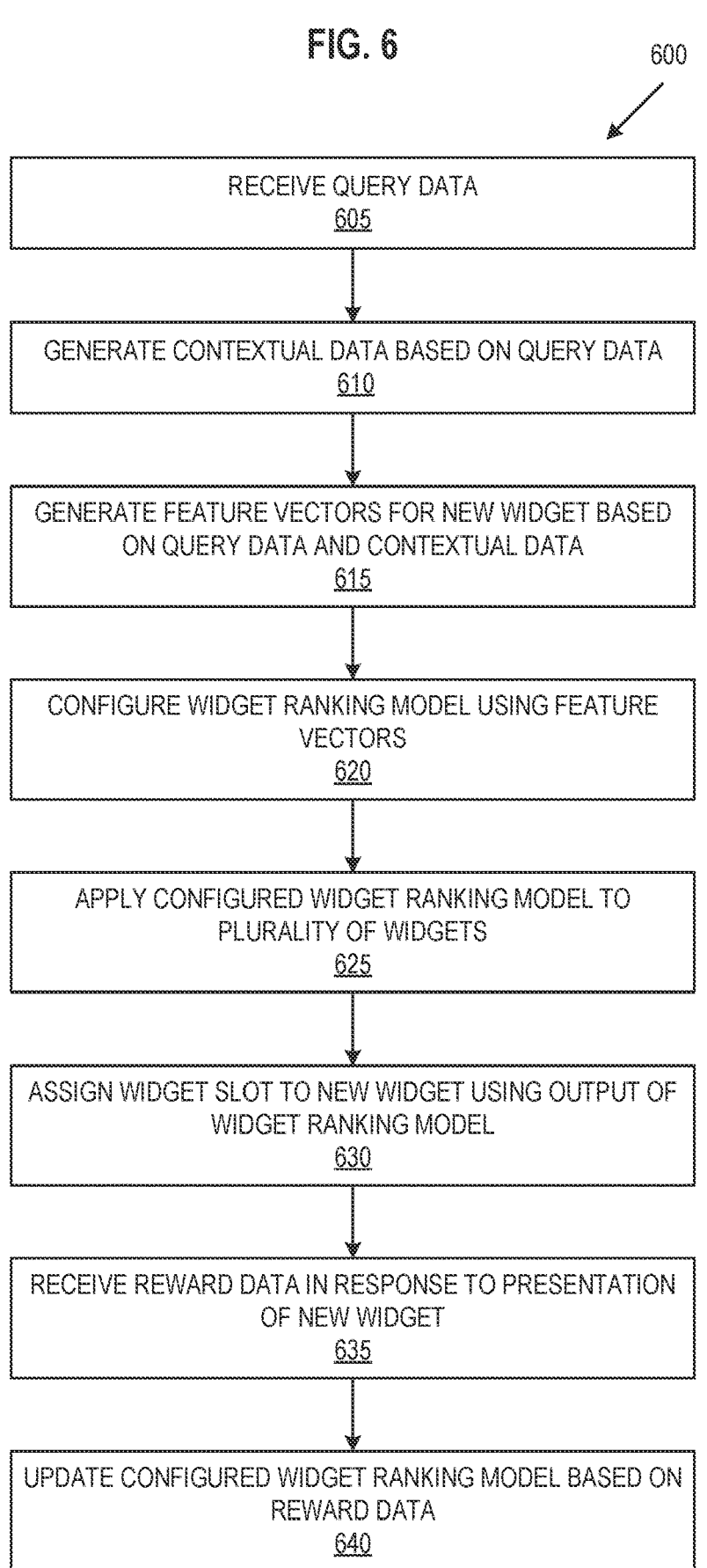

RECEIVE QUERY DATA
605

GENERATE CONTEXTUAL DATA BASED ON QUERY DATA
610

GENERATE FEATURE VECTORS FOR NEW WIDGET BASED
ON QUERY DATA AND CONTEXTUAL DATA
615

CONFIGURE WIDGET RANKING MODEL USING FEATURE
VECTORS
620

APPLY CONFIGURED WIDGET RANKING MODEL TO
PLURALITY OF WIDGETS
625

ASSIGN WIDGET SLOT TO NEW WIDGET USING OUTPUT OF
WIDGET RANKING MODEL
630

RECEIVE REWARD DATA IN RESPONSE TO PRESENTATION
OF NEW WIDGET
635

UPDATE CONFIGURED WIDGET RANKING MODEL BASED ON
REWARD DATA
640

AUTOMATED WIDGET PLACEMENT USING MACHINE LEARNING-BASED CONTEXTUAL ESTIMATION

TECHNICAL FIELD

A technical field to which the present disclosure relates is online search engines. Another technical field to which this disclosure relates is feature extraction for machine learning models.

BACKGROUND

A search engine is a computer system that searches for and identifies items in a database or on a network that correspond to search terms, such as keywords or characters specified by a user. A widget is an element of a graphical user interface. For example, a graphical user interface to a search engine can include a number of different widgets.

Machine learning is a category of artificial intelligence. In machine learning, a model is defined by a machine learning algorithm. A machine learning algorithm is a mathematical and/or logical expression of a relationship between inputs to and outputs of the machine learning model. The model is trained by applying the machine learning algorithm to input data. A trained model can be applied to new instances of input data to generate model output. Machine learning model output can include a prediction, a score, or an inference, in response to a new instance of input data.

Application systems can use the output of trained machine learning models to determine downstream execution decisions, such as decisions regarding various user interface functionality.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 1 illustrates an example computing system 100 that includes a widget feature generator 150 and widget model learner 160 in accordance with some embodiments of the present disclosure.

FIG. 6 is a flow diagram of an example method 600 to train machine learning ranking models to automate widget placement using contextual estimation in accordance with some embodiments of the present disclosure.

DETAILED DESCRIPTION

Figure 2:
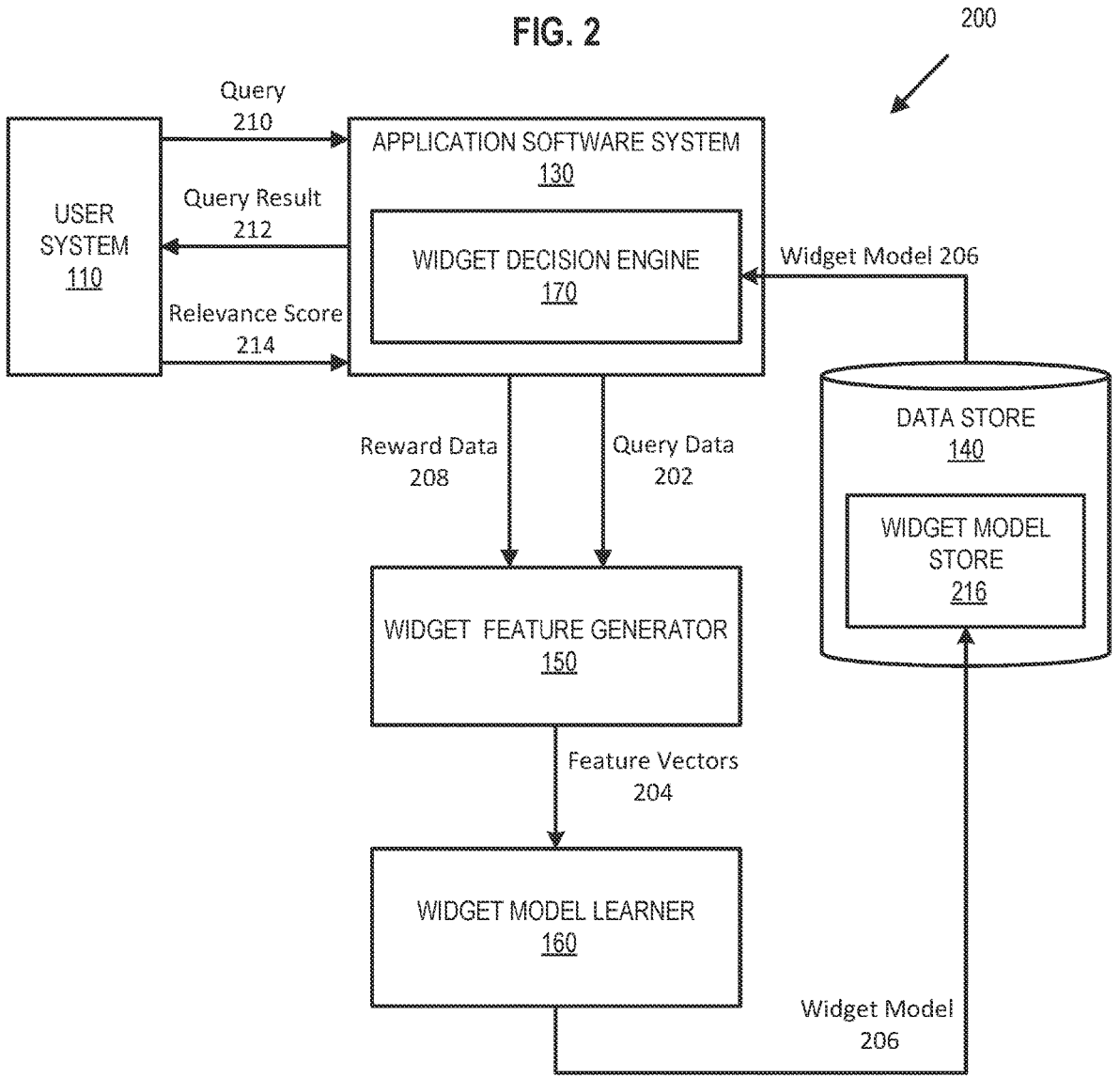
FIG. 2 illustrates another example computing system 200 that includes widget feature generator 150 and widget model learner 160 in accordance with some embodiments of the present disclosure.

Aspects of the present disclosure are directed to optimizing widget placement on a graphical user interface for a search engine using machine learning-based contextual estimation. As described in more detail below, using the disclosed methods, machine learning ranking models can be trained to rank widgets using exploration-exploitation based on contextual estimation.

Machine learning ranking models are trained to rank elements based on input data (also referred to as features). In some cases, these ranking models are used to display widgets to a user. A widget can be a portion of a graphical user interface (GUI) and/or the associated data to be displayed. For example, a widget is a search result in a page of search results. In an alternative example, a widget is a post shared on a social graph application. Additionally, widgets can correspond with a certain type of content displayed. For example, there may be a widget for posts and a widget for people. Each of the widget for posts and the widget for people may contain their own subdivisions, referred to as documents. In such a situation, a machine learning ranking model may need to rank the different hierarchies separately (e.g., the posts widget and the people widget as well as the documents contained in the post widget and the documents contained in the people widget).

Users prefer more relevant information and therefore more relevant widgets to be displayed more prominently. GUIs, however, have a limited number of widget slots available to display the widgets. Appropriate ranking and placement of widgets in widget slots is therefore important for a positive user experience. Traditionally, machine learning ranking models rely on historical information to determine widget placement. When a new widget is generated (e.g., a new content type), there is little to no historical information to rely on. Some systems place new widgets randomly until enough information is gathered to intelligently place the widget. This can be done for a small or large portion of the user base. When implementing this approach for a large portion of the user base, the overall user experience is hurt as irrelevant widgets may be placed in unjustifiably high (i.e., relevant) positions. Alternatively, when implementing this approach for a small portion of the user base, there is less harm to the overall user experience but it results in a very slow learning process before the widget can be intelligently placed.

Alternatively, systems can use rule-based placement to place a widget based on key words relating to the widget (e.g., a new widget for events would be ranked high in searches for events). This approach, however, results in long times to gather keywords or extensive use of curators to generate these keywords. Additionally, because the new widget shows up in only small portions of searches (e.g., only searches with specific keywords), there is an inherent bias in the data leading to poor relevance in the long term. Additionally, training such a system to intelligently place new widgets takes a very long time.

Aspects of the present disclosure address the above and other deficiencies by using contextual estimation and multi-armed bandit models to estimate ranking scores and associated uncertainties for widget placement and determining whether to explore or exploit using the ranking scores and uncertainties. The tradeoff between exploration and exploitation is the tradeoff between selecting an outcome that you already know will yield a positive result (i.e., exploitation) and selecting an outcome that you are uncertain whether it will yield a positive result but will gather more valuable information for future determinations (i.e., exploration). By using contextual data for known widgets (e.g., estimated ranking scores and associated uncertainties), the machine learning system can intelligently determine whether to explore or exploit. As a result, the harmful effects to user experience are minimized and the machine learning system is able to more quickly learn to intelligently place the new widget.

In the embodiment of FIG. 1, computing system 100 includes a user system 110, a network 120, an application software system 130, a data store 140, a widget feature generator 150, and a widget model learner 160. Each of these components of computing system 100 are described in more detail below.

User system 110 includes at least one computing device, such as a personal computing device, a server, a mobile computing device, or a smart appliance. User system 110 includes at least one software application, including a user interface 112, installed on or accessible by a network to a computing device. For example, user interface 112 can be or include a front-end portion of application software system 130.

User interface 112 is any type of user interface as described above. User interface 112 can be used to input search queries and view or otherwise perceive output that includes data produced by application software system 130. For example, user interface 112 can include a graphical user interface and/or a conversational voice/speech interface that includes a mechanism for entering a search query and viewing query results and/or other digital content. Examples of user interface 112 include web browsers, command line interfaces, and mobile apps. User interface 112 as used herein can include application programming interfaces (APIs).

Network 120 can be implemented on any medium or mechanism that provides for the exchange of data, signals, and/or instructions between the various components of computing system 100. Examples of network 120 include, without limitation, a Local Area Network (LAN), a Wide Area Network (WAN), an Ethernet network or the Internet, or at least one terrestrial, satellite or wireless link, or a combination of any number of different networks and/or communication links.

Application software system 130 is any type of application software system that includes or utilizes functionality and/or outputs provided by widget feature generator 150, widget model learner 160, and/or widget decision engine 170. Examples of application software system 130 include but are not limited to online services including connections network software, such as social media platforms, and systems that are or are not be based on connections network software, such as general-purpose search engines, content distribution systems including media feeds, bulletin boards, and messaging systems, special purpose software such as but not limited to job search software, recruiter search software, sales assistance software, advertising software, learning and education software, enterprise systems, customer relationship management (CRM) systems, or any combination of any of the foregoing.

A client portion of application software system 130 can operate in user system 110, for example as a plugin or widget in a graphical user interface of a software application or as a web browser executing user interface 112. In an embodiment, a web browser can transmit an HTTP request over a network (e.g., the Internet) in response to user input that is received through a user interface provided by the web application and displayed through the web browser. A server running application software system 130 and/or a server portion of application software system 130 can receive the input, perform at least one operation using the input, and return output using an HTTP response that the web browser receives and processes.

Data store 140 can include any combination of different types of memory devices. Data store 140 stores digital data used by user system 110, application software system 130, widget feature generator 150, widget model learner 160, and widget decision engine 170. Data store 140 can reside on at least one persistent and/or volatile storage device that can reside within the same local network as at least one other device of computing system 100 and/or in a network that is remote relative to at least one other device of computing system 100. Thus, although depicted as being included in computing system 100, portions of data store 140 can be part of computing system 100 or accessed by computing system 100 over a network, such as network 120.

While not specifically shown, it should be understood that any of user system 110, application software system 130, data store 140, widget feature generator 150, widget model learner 160, and widget decision engine 170 includes an interface embodied as computer programming code stored in computer memory that when executed causes a computing device to enable bidirectional communication with any other of user system 110, application software system 130, data store 140, widget feature generator 150, widget model learner 160, and widget decision engine 170 using a communicative coupling mechanism. Examples of communicative coupling mechanisms include network interfaces, inter-process communication (IPC) interfaces and application program interfaces (APIs).

Each of user system 110, application software system 130, data store 140, widget feature generator 150, widget model learner 160, and widget decision engine 170 is implemented using at least one computing device that is communicatively coupled to electronic communications network 120. Any of user system 110, application software system 130, data store 140, widget feature generator 150, widget model learner 160, and widget decision engine 170 can be bidirectionally communicatively coupled by network 120. User system 110 as well as one or more different user systems (not shown) can be bidirectionally communicatively coupled to application software system 130.

A typical user of user system 110 can be an administrator or end user of application software system 130, widget feature generator 150, widget model learner 160, and/or widget decision engine 170. User system 110 is configured to communicate bidirectionally with any of application software system 130, data store 140, widget feature generator 150, widget model learner 160, and/or widget decision engine 170 over network 120.

The features and functionality of user system 110, application software system 130, data store 140, widget feature generator 150, widget model learner 160, and widget decision engine 170 are implemented using computer software, hardware, or software and hardware, and can include combinations of automated functionality, data structures, and digital data, which are represented schematically in the figures. User system 110, application software system 130, data store 140, widget feature generator 150, widget model learner 160, and widget decision engine 170 are shown as separate elements in FIG. 1 for ease of discussion but the illustration is not meant to imply that separation of these elements is required. The illustrated systems, services, and data stores (or their functionality) can be divided over any number of physical systems, including a single physical computer system, and can communicate with each other in any appropriate manner.

Figure 7:
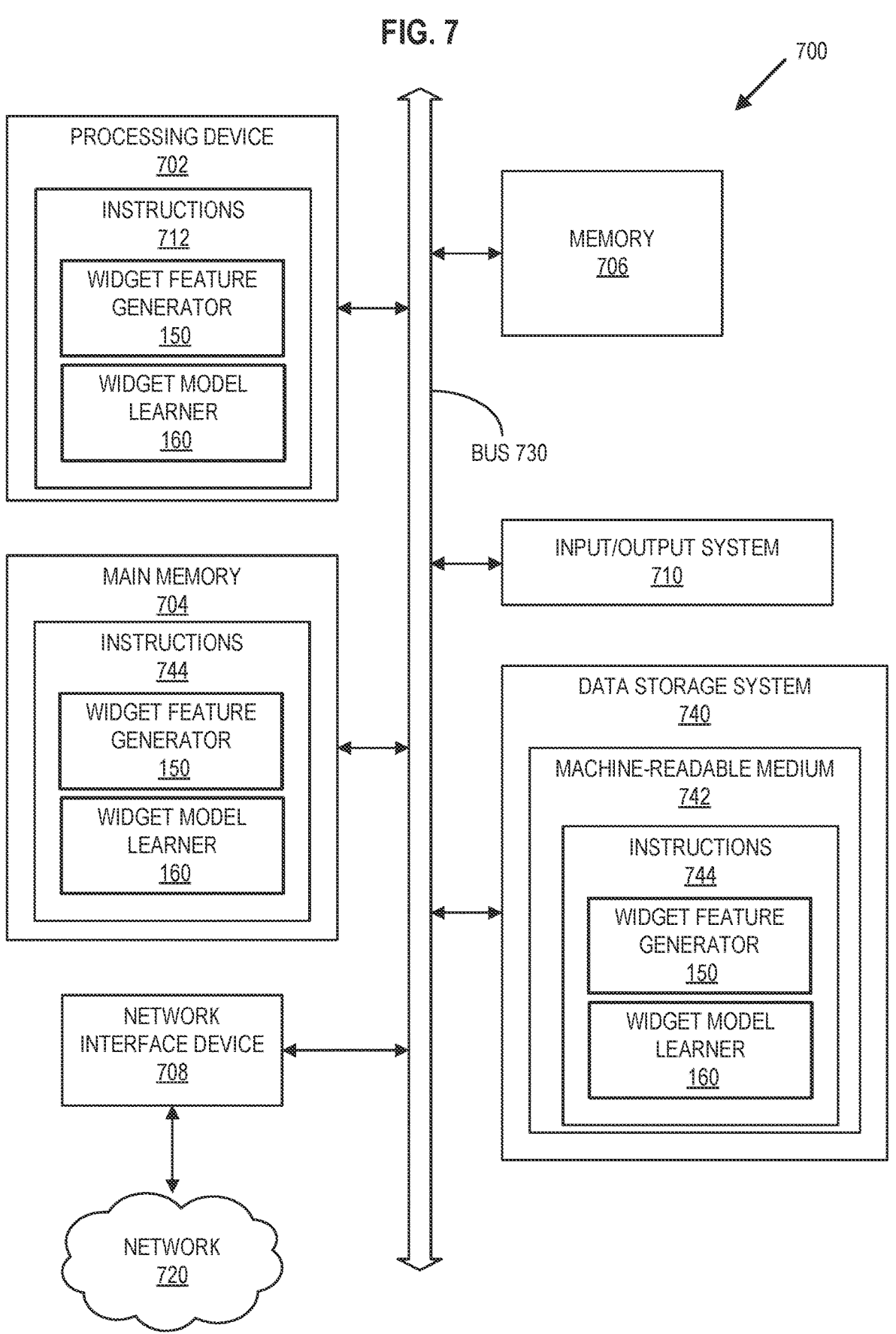
FIG. 7 is a block diagram of an example computer system in which embodiments of the present disclosure can operate.

The computing system 100 includes widget feature generator 150 that can generate feature vectors to train machine learning ranking model using contextual data. In some embodiments, the application software system 130 includes at least a portion of widget feature generator 150. As shown in FIG. 7, the widget feature generator 150 can be implemented as instructions stored in a memory, and a processing device 702 can be configured to execute the instructions stored in the memory to perform the operations described herein.

Widget feature generator 150 can generate feature vectors to train machine learning ranking model to rank a new widget using contextual data. The term new widget is used for ease of understanding and does not necessarily correspond with the most recent widget. For example, the new widget can be a widget that has little ranking information associated with it. Contextual data includes data relating to widget ranking scores and uncertainties as well as features for the widgets (e.g., aspects of the widgets used to determine the ranking score and uncertainty). For example, the contextual data includes data for ranking widgets excluding the new widget. The feature vectors can include samples derived from the ranking score and uncertainty of the ranked widgets, the widget features of the ranked widgets, and engagement features for the new widget. Engagement features include features relating the new widget to a query and/or a user. For example, engagement features can include a relatedness between the user and the widget. For example, widget feature generator 150 determines the relatedness between the user and the widget through affinity analysis as described with reference to FIG. 2 below. Further details regarding the definition and use of contextual data, feature vectors, and engagement features are described with reference to FIGS. 2 and 3. The disclosed technologies can be described with reference to an example use case of training a machine learning ranking model to rank widgets; for example, ranking search results in a social graph application such as a professional social network application. The disclosed technologies are not limited to social graph applications but can be used to rank results more generally. The disclosed technologies can be used by many different types of network-based applications in which ranking is useful.

The computing system 100 includes widget model learner 160 that can train a machine learning model using feature vectors generated from contextual data. In some embodiments, the application software system 130 includes at least a portion of widget model learner 160. As shown in FIG. 7, the widget model learner 160 can be implemented as instructions stored in a memory, and a processing device 702 can be configured to execute the instructions stored in the memory to perform the operations described herein.

Widget model learner 160 can train a machine learning model to determine model weights for different widget slot options to rank a new widget. Widget model learner 160 can generate training data including feature vectors for different placements of a new widget. For example, if there are eight possible slots to place the new widget, widget model learner 160 can generate model weights for each of the eight options using the feature vectors. Widget model learner 160 can also update the model weights based on reward data received from user engagement. Further details regarding the definition and use of feature vectors and model weights are described with reference to FIGS. 2-5. The disclosed technologies can be described with reference to an example use case of training a machine learning model to generate model weights used to rank widgets; for example, ranking search results in a social graph application such as a professional social network application. The disclosed technologies are not limited to social graph applications but can be used to rank results more generally. The disclosed technologies can be used by many different types of network-based applications in which ranking is useful.

Further details regarding the operations of widget feature generator 150 and widget model learner 160 are described below.

FIG. 2 illustrates another example computing system 200 that includes widget feature generator 150 and widget model learner 160 in accordance with some embodiments of the present disclosure. In the embodiment of FIG. 2, computing system 200 includes user system 110, application software system 130, data store 140, widget feature generator 150, and widget model learner 160. Example computing system 200 is illustrated for ease of discussion and may include additional elements not explicitly shown (e.g., network 120 of FIG. 1).

As shown in FIG. 2, in some embodiments, user system 110 sends query 210 to application software system 130. For example, a user of user system 110 may enter a search into a search engine implemented by application software system 130. Alternatively, query 210 may be sent automatically by user system 110 upon an action by the user. For example, the user may navigate to a web page with widget slots available. In response to receiving user input to navigate to the webpage, user system 110 generates query 210 and sends query 210 to application software system 130 to populate the widget slots. Alternatively, application software system 130 can receive a request for a webpage from user system 110 and application software system 130 generates query 210 to populate the widget slots.

In some embodiments, query 210 includes query data 202. For example, query data 202 includes query input of query 210, and metadata of query 210. Query input includes digital information to be used in the search provided by user of user system 110, user system 110, and/or application software system 130. For example, query input of query 210 includes text for a search initiated by a user of user system 110. In some embodiments, query input also includes any of an image, a video, audio, or other digital information to be used in a search. The metadata of query 210 can include an identifier for the user of user system 110. For example, the identifier identifies a user profile for the user of user system 110. The metadata of query 210 can also include data relating to the query including a time the query was initiated by the user, the last time a query was initiated by the user, an identifier of user system 110 used to initiate the query, the number of widget slots available, and similar metadata.

Application software system 130 receives query 210 and sends query data 202 to widget feature generator 150. In some embodiments, application software system 130 sends query data to data store 140 and widget feature generator 150 retrieves query data 202 from data store 140. In some embodiments, application software system 130 determines at least some of query data 202.

For example, application software system 130 determines the metadata of query 210.

Widget feature generator 150 receives query data 202 and uses query data 202 to generate feature vectors 204. For example, widget feature generator 150 uses the query data 202 to generate contextual data (such as contextual data 305 of FIG. 3) and uses query data 202 and the contextual data to generate feature vectors. In some embodiments, widget feature generator 150 generates a feature vector for each widget slot available to display a widget. For example, widget feature generator 150 receives metadata of query data 202 including a number of widget slots available for display. Widget feature generator 150 uses a trained machine learning ranking model to determine contextual data for the number of available widget slots. For example, widget feature generator 150 generates a ranking score and uncertainty for all widgets using the trained machine learning ranking model. Widget feature generator 150 uses the ranking scores, uncertainty, and widget features used to determine the score and uncertainty to generate feature vectors representing each of the available widget slots. The widget features are details about the widget and encode what aspects of the widget caused the widget to receive the ranking score that it did.

In some embodiments, widget feature generator 150 uses the ranking score and uncertainty to determine a distribution for the ranking of each widget. For example, widget feature generator 150 generates a distribution with the ranking score as a mean value and the uncertainty as the variance or standard deviation. As the trained machine learning ranking model gathers more contextual data, the uncertainty is reduced, and the distribution therefore narrows. Widget feature generator 150 samples the generated distribution to create a sampled ranking for each of the widget slots. In some embodiments, widget feature generator 150 samples the generated distribution using Thompson sampling. Because the variance of the distribution is based on the uncertainty, ranking scores with less certainty result in sampled rankings with a larger variety (e.g., higher degree of exploration versus exploitation). In contrast, ranking scores with more certainty result in sampled rankings with a smaller variety (e.g., higher degree of exploitation versus exploration). Because widget feature generator generates feature vectors 204 determining the degree of exploration versus exploitation based on the uncertainty of the widget ranking, the degree of exploration versus exploitation changes as more information is gathered for the widgets.

In some embodiments, widget feature generator 150 includes engagement features (such as engagement features 360 of FIG. 3) for the new widget in each of the feature vectors 204. For example, engagement features are features related to the new widget. In some embodiments, engagement features include a query affinity statistic, a searcher affinity statistic, and an overall document clickthrough rate. The query affinity statistic is a measure of similarity between the new widget and query 210. For example, widget feature generator 150 determines the query affinity statistic by performing an affinity analysis between documents contained in the new widget and information about query 210 such as query data 202. In some embodiments the affinity analysis is a comparison of attribute counts between the documents and query data 202. For example, widget feature generator 150 determines attributes (e.g., words, phrases, images, etc.) for the documents and query data 202. Widget feature generator 150 compares the attributes between the documents and query data 202 and counts the co-occurrence of the attributes between the documents and query data 202. In such an example, higher co-occurrence counts result in a higher similarity between the documents and query data 202 whereas lower co-occurrence counts result in a lower similarity. In other embodiments, other methods of affinity analysis and/or association rule learning are used. The searcher affinity statistic is a measure of similarity between the new widget and the user of user system 110 which initiated query 210. For example, widget feature generator 150 determines the searcher affinity statistic by performing an affinity analysis between documents contained in the new widget and information about the user of user system 110. In some embodiments, widget feature generator 150 uses metadata of query 210 (such as the user identifier) to perform the affinity analysis between documents contained in the new widget and information related to a user profile of the user. The overall document clickthrough rate is a measure of interactions with the new widget. For example, widget feature generator 150 determines the overall document clickthrough rate by determining the number of interactions with the documents in the new widget divided by the number of impressions of the documents in the new widget. Documents can show up in multiple different widgets and even if the new widget has never been shown, it can include a document that has been shown in another widget and therefore already has an associated clickthrough rate. Alternatively, as mentioned above, the new widget is a widget that has been presented before but has fewer interactions than other widgets. In some embodiments, an interaction is a click, and an impression is an instance where the document is displayed on user system 110 (such as on user interface 112). Widget feature generator 150 sends feature vectors 204 to widget model learner 160. Further details regarding feature vectors 204 are explained with reference to FIG. 3

Widget model learner 160 receives feature vectors 204 and uses feature vectors 204 to train widget model 206. For example, widget model learner 160 trains a multi-arm bandit machine learning model using feature vectors 204. The trained widget model 206 includes bandit weights for each of the available widget slots. In some embodiments, widget model learner 160 trains a separate machine learning model for each feature vector, resulting in a separate machine learning model for each of the available widget slots. In such an embodiment, each of the widget models (such as widget model 206) includes bandit weights representing the trained widget model. In some embodiments, widget model learner 160 stores widget model 206 in widget model store 216. Widget model store 216 is a portion of data store 140 configured to store widget model 206. For example, widget model store 216 is a storage solution integrated with widget model learner 160 which stores bandit weights for widget model 206. In some embodiments, widget model store 216 is a Binary Large Object (BLOB) storage configured to store large machine learning models. In some embodiments, widget model learner 160 sends widget model 206 to widget decision engine 170. Further details regarding widget model 206 are explained with reference to FIG. 4.

Figure 5:
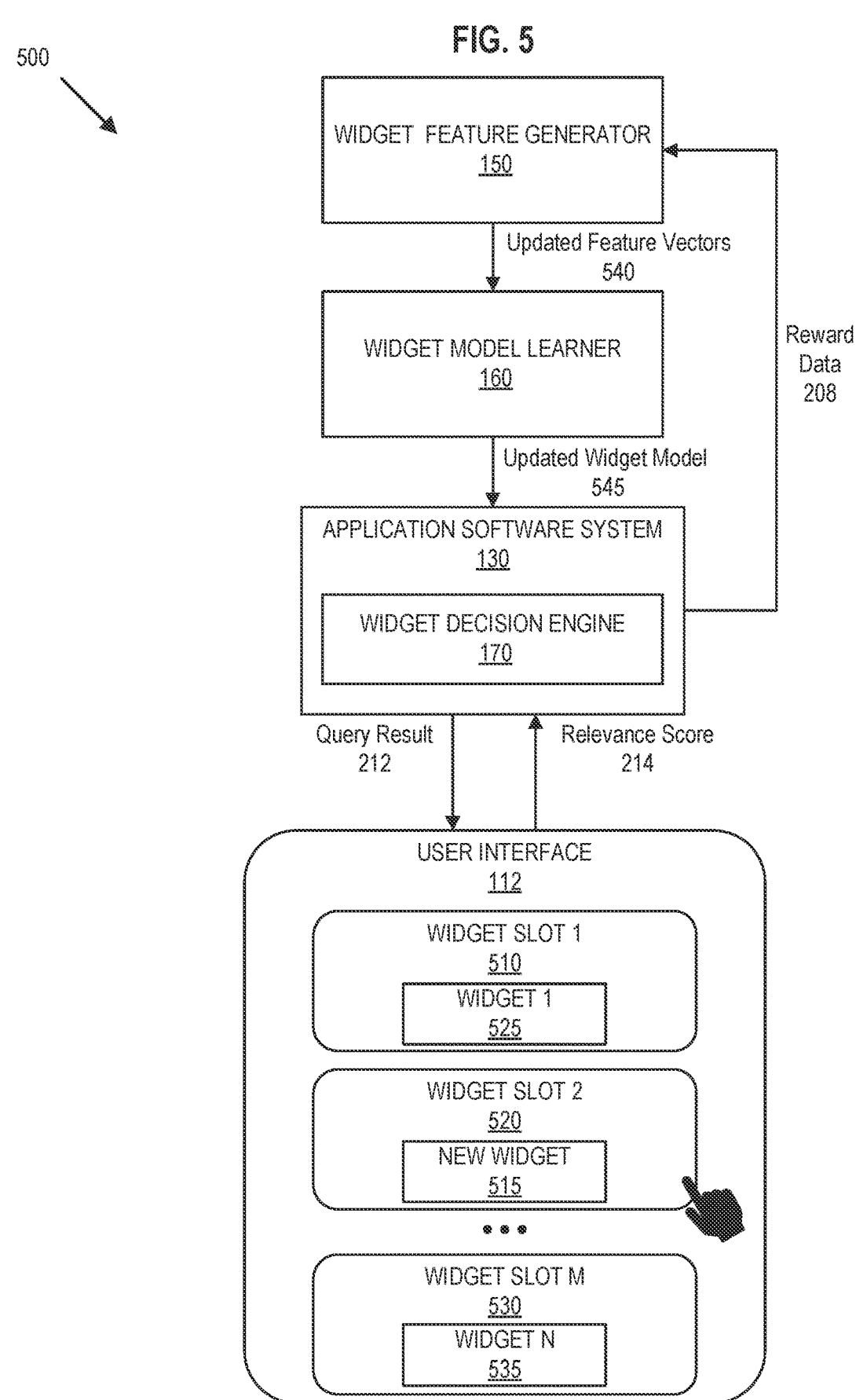
FIG. 5 illustrates another example computing system 500 that includes widget feature generator 150 and widget model learner 160 in accordance with some embodiments of the present disclosure.

In some embodiments widget decision engine 170 receives widget model 206 from widget model learner 160. In other embodiments, widget decision engine 170 retrieves widget model 206 from widget model store 216. For example, widget decision engine 170 retrieves widget model 206 from widget model store 216 in response to application software system 130 receiving query 210 from user system 110. In some embodiments, widget decision engine 170 includes a widget ranking model configured to rank widgets based on query 210 and widget model 206. For example, widget decision engine 170 uses the bandit weights of widget model 206 and feature vectors 204 to train a widget ranking model to rank the widgets. In some embodiments, widget decision engine 170 trains the widget ranking model to estimate an expected reward and a reward uncertainty and rank the widgets based on the expected reward and reward uncertainty. In some embodiments, widget decision engine 170 determines an expected reward and reward uncertainty for each of the available widget slots. For example, widget decision engine 170 receives a feature vector for a widget slot of the available widget slots. Using the identity of that widget slot, widget decision engine 170 retrieves the bandit weights associated with that widget slot from widget model store 216. Widget decision engine 170 computes the expected reward for that widget slot and the reward uncertainty. Once widget decision engine 170 computes the expected reward and the reward uncertainty for all of the available widget slots, widget decision engine 170 determines the query result 212. For example, widget decision engine 170 assigns the new widget to an available widget slot based on the expected rewards and reward uncertainties for the available widget slots. In some embodiments, widget decision engine 170 also determines the widgets to place in the remaining widget slots using the expected rewards and reward uncertainties. In other embodiments, the widgets to place in the available widget slots (other than the new widget) are already determined and widget decision engine 170 shifts the positions of all placed widgets down one beginning with the widget originally placed in the widget slot now to be occupied by the new widget. For example, as shown in FIG. 5, widget 1 525 is placed in widget slot 1, widget 2 is placed in widget slot 2 520, and so on. Widget decision engine 170 places new widget 515 at widget slot 2 520, places widget 2 in widget slots 3, etc. Further details regarding query result 212 are explained with reference to FIG. 5.

Widget decision engine 170 causes the query result 212 to be displayed on user system 110. For example, widget decision engine 170 sends the query result 212 to user system 110 which displays the query result 212 on a user interface, such as user interface 112 of FIG. 1. The user of user system 110 can interact with the query result 212, causing user system 110 to generate relevance score 214. For example, the user of user system 110 can select a widget slot of the available widget slots causing user system 110 to generate relevance score 214 identifying the selected widget slot. User system 110 sends relevance score 214 to application software system 130. Application software system 130 receives relevance score 214 and determines reward data 208 using relevance score 214. In some embodiments, user system 110 determines reward data 208 and sends reward data 208 to application software system 130. Application software system 130 sends reward data 208 to widget feature generator 150. Further details regarding relevance score 214 are explained with reference to FIG. 5.

Widget feature generator 150 receives reward data 208 and updates feature vectors 204 based on the reward data. For example, widget feature generator 150 includes reward data 208 in an updated feature vector. Widget feature generator 150 sends the updated feature vector to widget model learner 160 which updates the widget model 206 based on the updated feature vector. For example, the reward data 208 in the updated feature vector indicates which widget displayed in query result 212 was selected by the user. The updated widget model 206 will have a higher likelihood of displaying the selected widget (as indicated by reward data 208) in future queries that are similar to query 210. Further details regarding reward data 208 are explained with reference to FIG. 5

Figure 3:
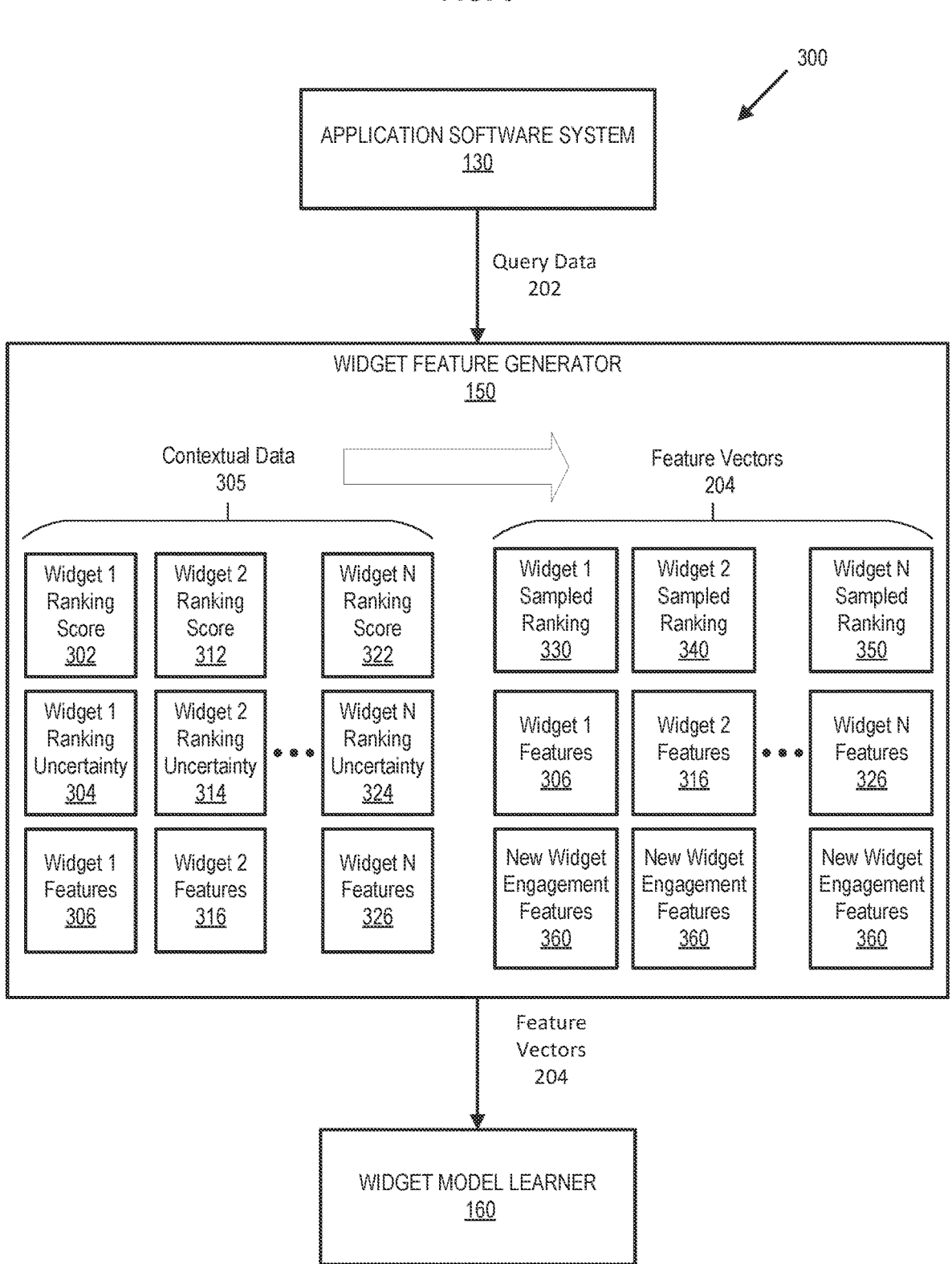
FIG. 3 illustrates another example computing system 300 that includes widget feature generator 150 and widget model learner 160 in accordance with some embodiments of the present disclosure.

FIG. 3 illustrates another example computing system 300 that includes widget feature generator 150 and widget model learner 160 in accordance with some embodiments of the present disclosure. Computing system 300 also includes application software system 130. Example computing system 300 is illustrated for ease of discussion and may include additional elements not explicitly shown (e.g., user system 110, network 120, and data store 140 of FIG. 1).

As shown in FIG. 3, contextual data 305 includes a ranking score 302, 312, and 322, ranking uncertainty 304, 314, and 324, and widget features 306, 316, and 326 for widgets one through N. Computing system 300 can include any number of widgets and the number of widgets can change over time. Each widget represents a certain type of content to be displayed. For example, in a social graph application, widgets can include people, products, companies, people who talk about a certain subject, posts, courses, jobs, and events. Each of the widgets includes documents to be displayed relating both to the respective widget and the query 210. In some embodiments, the documents are ranked according to machine learning models specific to a particular widget. The widgets may therefore be ranked separately from the documents. In such embodiments, even though a document has a very high ranking, it may have a low ranking in the query result 212 because it belongs to a widget with a low ranking.

Widget feature generator 150 generates ranking scores 302, 312, and 322 and ranking uncertainties 304, 314, and 324 for each of widgets one through N. For example, widget feature generator 150 uses widget features 306, 316, and 326 as inputs to a trained machine learning ranking model which generates ranking scores 302, 312, and 322 and associated ranking uncertainties 304, 314, and 324. In some embodiments, widget feature generator 150 uses ranking scores, ranking uncertainties, and features of one or more documents for each widget as the representative ranking score 302, 312, and 322, ranking uncertainty 304, 314, and 324, and features 306, 316, and 326. For example, widget feature generator 150 receives a document ranking score, document ranking uncertainty, and document features for the top document in widget one. Widget feature generator 150 uses the document ranking score as widget 1 ranking score 302, the document ranking uncertainty as widget 1 ranking uncertainty 304, and the document features as widget 1 features 306. In some embodiments, feature vectors 204 includes reward data, such as reward data 208.

As explained with reference to FIG. 2, widget feature generator 150 generates a distribution for each of the widgets one through N using the respective ranking score 302, 312, and 322 and ranking uncertainty 304, 314, and 324. In one embodiment, widget feature generator 150 generates a distribution for each of the widgets using the respective document ranking score and document ranking uncertainty for the top document. For example, widget feature generator 150 generates a distribution for widget 1 with a mean of the document ranking score for the top document of widget 1 and a standard deviation or variance of the document ranking uncertainty for the top document of widget 1. Widget feature generator 150 then samples the generated distribution using Thompson sampling to generate widget 1 sampled ranking 330, widget 2 sampled ranking 340, and widget N sampled ranking 350.

As explained with reference to FIG. 2, widget feature generator 150 includes engagement features 360 for the new widget in each of the feature vectors 204. In some embodiments, widget feature generator 150 uses metadata of query 210 (such as the user identifier) to perform the affinity analysis between documents contained in the new widget and information related to a user profile of the user. For example, widget feature generator 150 uses metadata of the query data 202 to identify a user profile and associated historical activity of the user associated with the user profile.

For example, in a social graph application, the historical activity data includes posts, people, jobs, or other aspects of the social graph application that the user liked or otherwise interacted with (e.g., commented, messaged, etc.). Widget feature generator 150 uses the historical activity data of the user to perform the affinity analysis between the documents contained in the new widget and the historical activity data of the user.

Figure 4:
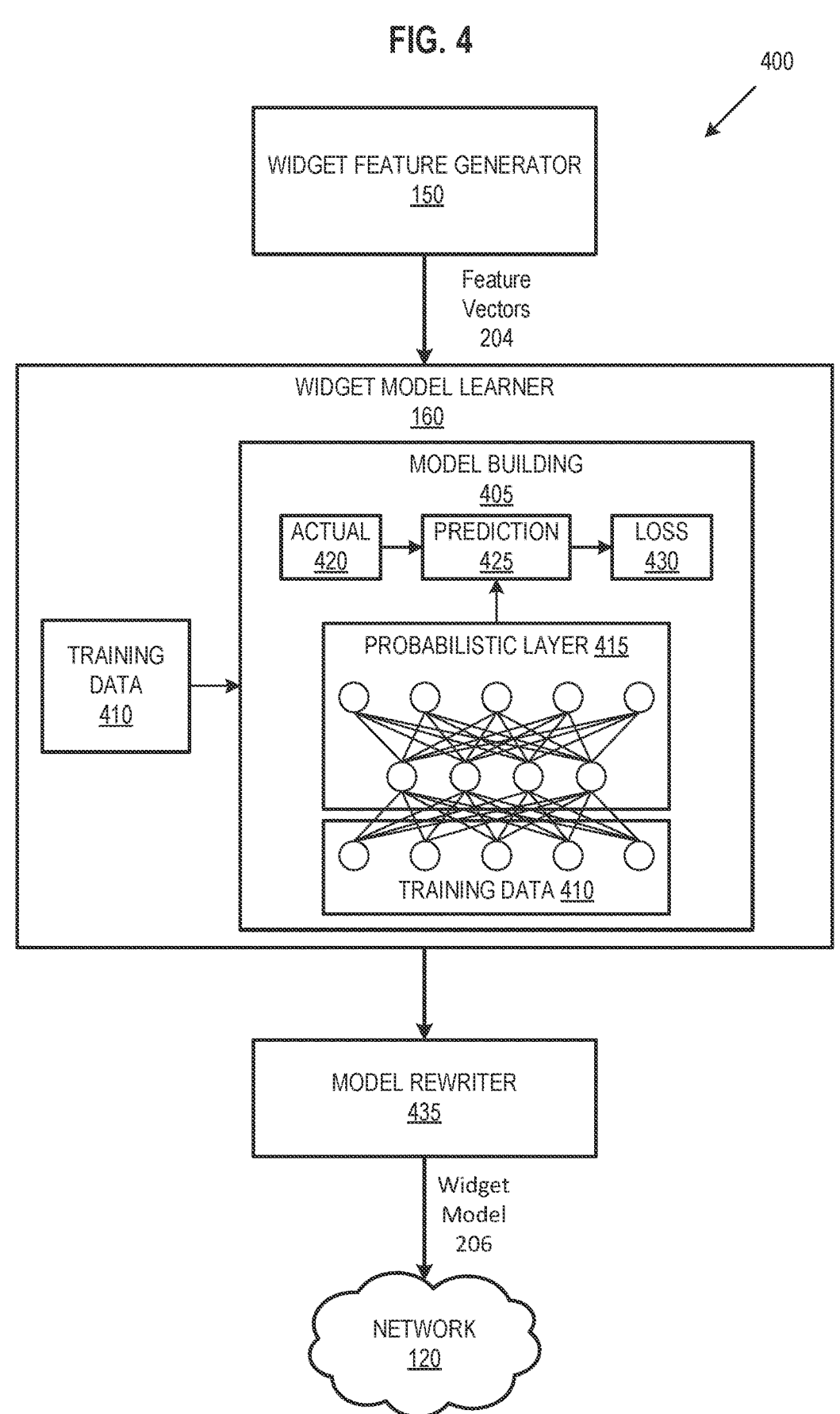
FIG. 4 illustrates another example computing system 400 that includes widget feature generator 150 and widget model learner 160 in accordance with some embodiments of the present disclosure.

FIG. 4 illustrates another example computing system 400 that includes widget feature generator 150 and widget model learner 160 in accordance with some embodiments of the present disclosure. Computing system 400 also includes model rewriter 435 and network 120. Example computing system 400 is illustrated for ease of discussion and may include additional elements not explicitly shown (e.g., user system 110, application software system 130, and data store 140 of FIG. 1).

As shown in FIG. 4, widget model learner 160 receives feature vectors 204 and generates training data 410. For example, widget model learner 160 uses feature vectors 204 as training data in model building 405. In some embodiments, model building 405 is a component for training, validating, and executing a neural network, such as a Bayesian neural network, which estimates rewards (e.g., prediction 425) using training data 410. In some embodiments, model building 405 is a component for training, validating, and executing a linear contextual bandit algorithm, such as a linear contextual bandit with upper confidence bound model (UCB) or a linear contextual bandit with Thompson sampling. In other embodiments, model building 405 is a component for training, validating, and executing a logistic contextual bandit algorithm. For example, model building 405 uses training data 410 as inputs and creates a neural network with hidden layers such as probabilistic layer 415. Model building 405 generates prediction 425 of an estimated reward using probabilistic layer 415. Model building 405 compares prediction 425 to actual 420 which is the actual reward data 208.

In some embodiments, model building 405 uses a linear contextual bandit model with every arm $a_i$ (e.g., widget slot of the available widget slots) represented by a feature vector $x_i$ (e.g., one of feature vectors 208). The bandit weights for each arm are represented by $w_i$, where $w_i$ is represented by $$A_i^{-1} b_i,$$

where $A_i$ is a matrix and $b_i$ is a coefficient of the matrix. Rewards $r_i$ are calculated as $$r_i = w_i \times x_i + \sqrt{x_i \times A_i^{-1} x_i}.$$

For a widget where there is no collected data, $A_i$ is the identity matrix and $b_1 = 0$. Model building 405 trains the machine learning model to maximize $r_i$ by comparing the predicted $r_i$ (e.g., prediction 425) to reward data 208 (e.g., actual 420). Model building 405 calculates loss 430 based on the difference between actual 420 and prediction 425. Model building 405 then updates training data 410 for the selected arm as follows:

$$A_i = A_i + x_i \times x_i^T; \quad b_i = b_i + r_i \times x_i.$$

In other embodiments, model building 405 uses a logistic contextual bandit model with every arm $a_i$ (e.g., widget slot of the available widget slots) represented by a feature vector $x_i$ (e.g., one of feature vectors 208). The bandit weights for each arm are represented by $w_i$, where $w_i$ is represented as a normal distribution with mean $\mu_i$ and standard deviation matrix $\Sigma_i$. Rewards $r_i$ are calculated as $\sigma(-w_i x_i)$, where $\sigma(\ )$ represents the standard deviation. For a widget where there is no collected data, $\Sigma_i$ is the identity matrix and $\mu_i = 0$. Model building 405 trains the machine learning model to maximize $r_i$ by comparing the predicted $r_i$ (e.g., prediction 425) to reward data 208 (e.g., actual 420). Model building 405 calculates loss 430 based on the difference between actual 420 and prediction 425. Model building 405 then updates training data 410 for the selected arm as follows:

$$\mu_i = \underset{w}{\mathrm{argmax}} - \frac{1}{2}(w - \mu_i)^T \sum_i^{-1}(w - \mu_i) +$$
$$r_i \log(\sigma(w^T x_i)) + (1 - r_i)\log(1 - \sigma(w^T x_i));$$
$$\sum_i^{-1} = \sum_i^{-1} + \sigma(\mu_i^T x_i)(1 - \sigma(\mu_i^T x_i))x_i x_i^T.$$

In some embodiments model rewriter 435 receives widget model 206 and rewrites the widget model 206 to generate a new machine learning model with the same structure and weights as widget model 206. In some embodiments, model rewriter 435 again rewrites the new machine learning model to generate a machine learning model to be served online. Model rewriter 435 sends the machine learning model to network 120 for distribution and execution.

FIG. 5 illustrates another example computing system 500 that includes widget feature generator 150 and widget model learner 160 in accordance with some embodiments of the present disclosure. Computing system 500 also includes application software system 130 and user interface 112. Example computing system 500 is illustrated for ease of discussion and may include additional elements not explicitly shown (e.g., user system 110, network 120, and data store 140 of FIG. 1).

As shown in FIG. 5, application software system 130 sends query result 212 to user interface 112. User interface 112 is a user interface of a user system, such as user system 110 of FIG. 1. User interface 112 includes an interface to present query result 212 to a user of user interface 112. For example, user interface 112 presents widget 1 525, new widget 515, and widget N 535 in widget slot 1 510, widget slot 2 520, and widget slot M 530 respectively. In some embodiments, user interface 112 also includes functionality for the user to interact with user interface 112. For example, user interface 112 is a mobile application and uses a GUI to display query result 212 to the user of user interface 112. User interface 112 presents the widgets in the widget slots according to query result 212. For example, widget slot 1 510 is the top widget slot presented on user interface 112. The top widget slot means that the widget is presented most prominently to the user of user interface and does not necessarily mean that the widget slot is presented first.

User interface 112 can present query result 212 through different mediums. In one embodiment, user interface 112 is a touch screen of a mobile device such as a smartphone and query result 212 is displayed on the touch screen of the mobile device. In such an embodiment, user interface 112 can register a user interaction with the touch screen, such as a tap on a widget slot. In one embodiment, user interface 112 is an audio device and query result 212 is presented through audio in an order determined by widget slots 510, 520, and 530. In such an embodiment, user interface 112 can register a user interaction with the audio device, such as a spoken response.

User system 110 determines relevance score 214 based on a user interaction with user interface 112. For example, as shown in FIG. 5, the user selects widget slot 2 520 corresponding with new widget 515. User system 110 registers the user selection of widget slot 2 520 and generates relevance score 214 indicating that widget slot 2 520 was selected.

In some embodiments, application software system 130 receives relevance score 214 and determines reward data 208 using relevance score 214. For example, relevance score 214 indicates which widget slot the user interacted with and reward data 208 is a binary indicator for each widget slot indicating whether it received a user interaction. In such an example, reward data 208 includes a 1 if the widget slot was selected and a 0 if a different widget slot was selected. In some embodiments, reward data 208 is discarded if no widget slot is selected.

In some embodiments, application software system 130 determines reward data 208 based on the placement of the assigned widget slot and the placement of the selected widget slot. For example, if a widget slot is selected, reward data 208 includes a 1. If, however, a different widget slot below the widget slot was selected, reward data 208 includes a value of 1/position selected, where position selected is an indicator of the index of the widget slot selected. In such embodiments, reward data 208 is discarded if no widget slot is selected or if a higher ranked widget slot is selected. By modifying the reward data based on the selection of the widget, the system has less penalization for suboptimal placements where the selected widget slot is ranked very low. For example, when a widget other than the new widget is selected, instead of a reward value of 0, the reward value is non-zero but decreases as the selected position gets further away from the new widget placement. This allows for variable reward values with higher penalization when the selected widget is far from the new widget placement and lower penalization when the selected widget is close to the new widget placement.

Widget feature generator 150 receives reward data 208 and uses reward data 208 to determine updated feature vectors 540. For example, widget feature generator 150 includes reward data 208 in feature vectors 204 to create updated feature vectors 540. Widget feature generator 150 sends updated feature vectors 540 to widget model learner 160 which uses updated feature vectors 540 and widget model 206 to create updated widget model 545. For example, widget model learner 160 uses updated feature vectors 540 as training data with reward data 208 used as an actual output (e.g., actual 420 of FIG. 4) to compare to a predicted output (e.g., prediction 425 of FIG. 4) and update the model weights of widget model 206 to create updated widget model 545.

FIG. 6 is a flow diagram of an example method 600 to train machine learning ranking models to automate widget placement using contextual estimation, in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by widget feature generator 150 of FIG. 1. In other embodiments, the method 600 is performed by widget model learner 160 of FIG. 1. In still other embodiments, the method 600 is performed by a combination of widget feature generator 150 and widget model learner 160 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 605, the processing device receives query data. For example, an application software system (such as application software system 130 of FIG. 1) registers a user of a user system (such as user system 110 of FIG. 1) entering a search into a search engine implemented by the application software system. The search includes query data (such as query data 202 of FIG. 2). For example, query data 202 includes query input of the search and metadata of the search. Query input includes digital information to be used in the search. For example, query input includes text for the search. In some embodiments, query input also includes any of an image, a video, audio, or other digital information to be used in a search. The metadata can include an identifier for the user of the user system. For example, the identifier identifies a user profile for the user. The metadata can also include data relating to the search including a time the search was initiated by the user, the last time a search was initiated by the user, an identifier of the user system used to initiate the search, the number of widget slots available, and similar metadata. Further details regarding receiving query data are described with reference to FIGS. 2 and 3.

At operation 610, the processing device generates contextual data based on the query data. For example, widget feature generator 150 uses the query data to generate contextual data (such as contextual data 305 of FIG. 3). The processing device uses a trained machine learning ranking model to determine contextual data for the number of available widget slots. For example, widget feature generator 150 generates a ranking score and uncertainty for all widgets using the trained machine learning ranking model. The processing device uses the ranking scores, uncertainty, and widget features used to determine the score and uncertainty to generate feature vectors representing each of the available widget slots. The widget features are details about the widget and encode what aspects of the widget caused the widget to receive the ranking score that it did. Further details regarding generating contextual data are described with reference to FIGS. 2 and 3.

At operation 615, the processing device generates feature vectors for a new widget based on the query data and the contextual data. For example, widget feature generator 150 uses the ranking score and uncertainty to determine a distribution for the ranking of each widget. In some embodiments, the processing device generates a distribution with the ranking score as a mean value and the uncertainty as the variance or standard deviation. As the trained machine learning ranking model gathers more contextual data, the uncertainty is reduced, and the distribution therefore narrows. The processing device samples the generated distribution to create a sampled ranking for each of the widget slots. In some embodiments, the processing device samples the generated distribution using Thompson sampling.

In some embodiments, the processing device includes engagement features for the new widget in the feature vectors (such as feature vectors 204 of FIG. 2). For example, engagement features are features related to the new widget. In some embodiments, engagement features include a query affinity statistic, a searcher affinity statistic, and an overall document clickthrough rate. In some embodiments, the processing device uses metadata of the query (such as the user identifier) to perform the affinity analysis between documents contained in the new widget and information related to a user profile of the user. In some embodiments, the feature vectors include reward data (such as reward data 208 of FIG. 2). Further details regarding generating feature vectors are described with reference to FIGS. 2 and 3.

At operation 620, the processing device configures a widget ranking model using the feature vectors. For example, the widget ranking model includes a bandit model described with reference to widget model learner 160 of FIG. 4. The bandit model can include a linear contextual bandit model and/or a logistic contextual bandit model described with reference to model building 405 of FIG. 4. The widget ranking model also includes a ranking portion used to rank the widgets using the feature vectors and the model weights of the bandit model. Further details with regards to configuring a widget ranking model are described with reference to FIGS. 2, 4, and 5.

At operation 625, the processing device applies the configured widget ranking model to the plurality of widgets. For example, widget decision engine 170 uses a feature vector for a widget slot of the available widget slots. Using the identity of that widget slot, widget decision engine 170 retrieves the bandit weights associated with that widget slot from a widget model store (such as widget model store 216 of FIG. 2). Widget decision engine 170 computes the expected reward for that widget slot and the reward uncertainty. Once widget decision engine 170 computes the expected reward and the reward uncertainty for all of the available widget slots, widget decision engine 170 determines the query result (e.g., query result 212 or FIG. 2) based on the configured widget ranking model ranking the available slots using the feature vectors, expected reward, and reward uncertainty. Further details regarding applying the configured widget ranking model are described with reference to FIGS. 2 and 4.

At operation 630, the processing device assigns a widget slot to the new widget using the output of the widget ranking model. For example, widget decision engine 170 assigns the new widget to an available widget slot based on the expected rewards and reward uncertainties for the available widget slots. In some embodiments, the processing device also determines the widgets to place in the remaining widget slots using the expected rewards and reward uncertainties. In other embodiments, the widgets to place in the available widget slots (other than the new widget) are already determined and the processing device shifts the positions of all placed widgets down one beginning with the widget originally placed in the widget slot now to be occupied by the new widget. Further details regarding assigning a widget slot to the new widget are explained with reference to FIGS. 2 and 5.

At operation 635, the processing device receives reward data in response to presentation of the new widget. For example, application software system 130 causes a query result (such as query result 212 of FIG. 2) to be presented on a user interface (such as user interface 112 of FIG. 1). In some embodiments, the user interface is a mobile application and uses a GUI to display the query result to a user of the user interface. The processing device causes the widgets to be presented in the widget slots according to query result. The processing device can cause the query result to be presented through different mediums. In one embodiment, the user interface is a touch screen of a mobile device such as a smartphone and the processing device causes the query result to be displayed on the touch screen of the mobile device. In such an embodiment, the user interface can register a user interaction with the touch screen, such as a tap on a widget slot. In one embodiment, the user interface is an audio device, and the processing device causes the query result to be presented through audio. In such an embodiment, the user interface can register a user interaction with the audio device, such as a spoken response. User system 110 determines a relevance score based on a user interaction with the user interface. In some embodiments, the processing device receives the relevance score and determines the reward data using the relevance score. For example, the relevance score indicates which widget slot the user interacted with and reward data is a binary indicator for each widget slot indicating whether it received a user interaction. In such an example, the reward data includes a 1 if the widget slot was selected and a 0 if a different widget slot was selected. In some embodiments, the reward data is discarded if no widget slot is selected.

In some embodiments, the processing device determines the reward data based on the placement of the assigned widget slot and the placement of the selected widget slot. For example, if a widget slot is selected, the reward data includes a 1. If, however, a different widget slot below the widget slot was selected, the reward data includes a value of 1/position selected, where position selected is an indicator of the index of the widget slot selected. In such embodiments, the reward data is discarded if no widget slot is selected or if a higher ranked widget slot is selected. By modifying the reward data based on the selection of the widget, the system has less penalization for misplacements where the widget slot is ranked very low. Further details regarding receiving reward data are explained with reference to FIGS. 2 and 5

At operation 640, the processing device updates the configured widget ranking model based on the reward data. For example, widget feature generator 150 uses the reward data to determine updated feature vectors. In some embodiments, the processing device includes the reward data in feature vectors to create updated feature vectors. The processing device sends the updated feature vectors to a widget model learner (such as widget model learner 160 of FIG. 1) which updates the configured widget ranking model using the updated feature vectors. For example, widget model learner 160 uses updated feature vectors as training data for the bandit model with reward data used as an actual output (e.g., actual 420 of FIG. 4) to compare to a predicted output (e.g., prediction 425 of FIG. 4) and update the model weights of the bandit model. Further details regarding receiving reward data are explained with reference to FIGS. 2 and 4

FIG. 7 illustrates an example machine of a computer system 700 within which a set of instructions for causing the machine to perform any one or more of the methodologies discussed herein, can be executed. In some embodiments, the computer system 700 can correspond to a component of a networked computer system (e.g., the computer system 100 of FIG. 1) that includes, is coupled to, or utilizes a machine to execute an operating system to perform operations corresponding to widget feature generator 150 and/or widget model learner 160 of FIG. 1. The machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a smart phone, a tablet PC, a set-top box (STB), a Personal Digital Assistant (PDA), a cellular telephone, a web appliance, a server, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random-access memory (DRAM) such as synchronous DRAM (SDRAM) or Rambus DRAM (RDRAM), etc.), a memory 706 (e.g., flash memory, static random-access memory (SRAM), etc.), an input/output system 710, and a data storage system 740, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 712 for performing the operations and steps discussed herein.

The computer system 700 can further include a network interface device 708 to communicate over the network 720. Network interface device 708 can provide a two-way data communication coupling to a network. For example, network interface device 708 can be an integrated-services digital network (ISDN) card, cable modem, satellite modem, or a modem to provide a data communication connection to a corresponding type of telephone line. As another example, network interface device 708 can be a local area network (LAN) card to provide a data communication connection to a compatible LAN. Wireless links can also be implemented. In any such implementation network interface device 708 can send and receive electrical, electromagnetic or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic or optical signals that carry digital data to and from computer system computer system 700.

Computer system 700 can send messages and receive data, including program code, through the network(s) and network interface device 708. In the Internet example, a server can transmit a requested code for an application program through the Internet and network interface device 708. The received code can be executed by processing device 702 as it is received, and/or stored in data storage system 740, or other non-volatile storage for later execution.

The input/output system 710 can include an output device, such as a display, for example a liquid crystal display (LCD) or a touchscreen display, for displaying information to a computer user, or a speaker, a haptic device, or another form of output device. The input/output system 710 can include an input device, for example, alphanumeric keys and other keys configured for communicating information and command selections to processing device 702. An input device can, alternatively or in addition, include a cursor control, such as a mouse, a trackball, or cursor direction keys for communicating direction information and command selections to processing device 702 and for controlling cursor movement on a display. An input device can, alternatively or in addition, include a microphone, a sensor, or an array of sensors, for communicating sensed information to processing device 702

Sensed information can include voice commands, audio signals, geographic location information, and/or digital imagery, for example.

The data storage system 740 can include a machine-readable storage medium 742 (also known as a computer-readable medium) on which is stored one or more sets of instructions 744 or software embodying any one or more of the methodologies or functions described herein. The instructions 744 can also reside, completely or at least partially, within the main memory 704 and/or within the processing device 702 during execution thereof by the computer system 700, the main memory 704 and the processing device 702 also constituting machine-readable storage media.

In one embodiment, the instructions 744 include instructions to implement functionality corresponding to a widget feature generator and a widget model learner (e.g., widget feature generator 150 and widget model learner 160 of FIG. 1). While the machine-readable storage medium 742 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 100, can carry out the computer-implemented method 600 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

Illustrative examples of the technologies disclosed herein are provided below. An embodiment of the technologies may include any of the examples or a combination of the described below.

An example 1 includes receiving query data, based on the received query data, generating contextual data for widgets and widget slots, where widget slots include locations in a graphical user interface to which the widgets can be assigned, generating feature vectors for a new widget of the widgets based on the query data and the contextual data. configuring a widget ranking model using the feature vectors, applying the configured widget ranking model to the widgets, assigning a widget slot of the widget slots to the new widget using an output of the configured widget ranking model, receiving, from the graphical user interface, reward data in response to a presentation of the new widget in the assigned widget slot, and updating the configured widget ranking model based on the reward data.

An example 2 includes the subject matter of example 1 further including generating an engagement feature for the new widget using the query data, where the feature vectors include the engagement feature. An example 3 includes the subject matter of example 2, where receiving the query data includes receiving a query including the query data from a user, where the query data includes a query input of the query and metadata of the query. An example 4 includes the subject matter of example 3, where generating contextual data includes determining historical activity data for the user using the metadata and generating the contextual data using the historical activity data. An example 5 includes the subject matter of any of examples 3 and 4, where generating the engagement feature includes generating the engagement feature using the query input and the metadata. An example 6 includes the subject matter of any of examples 1-5, where generating the feature vectors includes generating a distribution using a ranking score and a ranking uncertainty for a widget slot of the widget slots and creating a sampled ranking for the widget slot by sampling the distribution, where the feature vectors include the sampled ranking. An example 7 includes the subject matter of any of examples 1-6, where the configured widget ranking model includes model weights, further including retrieving the model weights for the widget slots and computing expected rewards and reward uncertainties for the model weights, where applying the configured widget ranking model to the widgets includes ranking the widgets based on the expected rewards and reward uncertainties. An example 8 includes the subject matter of example 7, where updating the configured widget ranking model based on the reward data includes updating a model weight of the model weights for the new widget based on the reward data. An example 9 includes the subject matter of any of examples 1-8, where receiving reward data includes receiving, from the graphical user interface, a relevance score for the presentation of the query result based on a user interaction with the query result and determining the reward data using the relevance score. An example 10 includes the subject matter of example 9, where determining the reward data using the relevance score includes determining the reward data based on a placement of the assigned widget slot in the widget slots.

An example 11 includes a system including at least one memory device and a processing device operatively coupled with the at least one memory device, the processing device to receive query data, based on the received query data, generate contextual data for widgets and widget slots, where widget slots include locations in a graphical user interface to which the widgets can be assigned, generate feature vectors for a new widget of the widgets based on the query data and the contextual data. configure a widget ranking model using the feature vectors, apply the configured widget ranking model to the widgets, assign a widget slot of the widget slots to the new widget using an output of the configured widget ranking model, receive, from the graphical user interface, reward data in response to a presentation of the new widget in the assigned widget slot, and update the configured widget ranking model based on the reward data.

An example 12 includes the subject matter of example 11, where the processing device is further to generate an engagement feature for the new widget using the query data, where the feature vectors include the engagement feature. An example 13 includes the subject matter of example 12, where receiving the query data includes receiving a query including the query data from a user, where the query data includes a query input of the query and metadata of the query. An example 14 includes the subject matter of example 13, where generating contextual data includes determining historical activity data for the user using the metadata and generating the contextual data using the historical activity data. An example 15 includes the subject matter of any of examples 13 and 14, where generating the engagement feature includes generating the engagement feature using the query input and the metadata. An example 16 includes the subject matter of any of examples 11-15, where generating the feature vectors includes generating a distribution using a ranking score and a ranking uncertainty for a widget slot of the widget slots and creating a sampled ranking for the widget slot by sampling the distribution, where the feature vectors include the sampled ranking. An example 17 includes the subject matter of any of examples 11-16, where the configured widget ranking model includes model weights and where the processing device is further to retrieve the model weights for the widget slots and compute expected rewards and reward uncertainties for the model weights, where applying the configured widget ranking model to the widgets includes ranking the widgets based on the expected rewards and reward uncertainties. An example 18 includes the subject matter of example 17, where updating the configured widget ranking model based on the reward data includes updating a model weight of the model weights for the new widget based on the reward data. An example 19 includes the subject matter of any of examples 11-18, where receiving reward data includes receiving, from the graphical user interface, a relevance score for the presentation of the query result based on a user interaction with the query result and determining the reward data using the relevance score. An example 20 includes the subject matter of example 19, where determining the reward data using the relevance score includes determining the reward data based on a placement of the assigned widget slot in the widget slots.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:

based on received query data, generating contextual data for a plurality of widgets and a plurality of widget slots, wherein the plurality of widget slots comprises locations in a graphical user interface that are assigned to the plurality of widgets and the contextual data comprises ranking scores and ranking uncertainties for the plurality of widgets;

generating a plurality of distributions for the plurality of widgets using the ranking scores and ranking uncertainties for the plurality of widgets;

creating a plurality of sampled rankings for the plurality of widgets by sampling the plurality of distributions;

generating feature vectors for a new widget of the plurality of widgets using the plurality of sampled rankings;

training a machine learning ranking model using the feature vectors, wherein the machine learning ranking model comprises a plurality of model weights for the plurality of widget slots;

retrieving the plurality of model weights for the plurality of widget slots;

computing a plurality of expected rewards and reward uncertainties for the plurality of model weights;

applying the machine learning ranking model to the plurality of widgets including the new widget, wherein the applying comprises ranking the plurality of widgets based on the plurality of expected rewards and reward uncertainties;

causing presentation of the new widget in the graphical user interface via a widget slot of the plurality of widget slots determined using the plurality of model weights of the machine learning ranking model; and receiving reward data via the graphical user interface in response to the presentation of the new widget via the widget slot determined using the plurality of model weights of the machine learning ranking model, wherein receiving the reward data comprises:

receiving, from the graphical user interface, a relevance score for the presentation of the new widget in the widget slot based on a user interaction with the new widget;

determining the reward data using the relevance score; and updating a model weight of the plurality of model weights for the new widget based on the reward data.

2. The method of claim 1, further comprising:

generating an engagement feature for the new widget using the query data, wherein the feature vectors include the engagement feature.

3. The method of claim 2, wherein receiving the query data comprises:

receiving a query including the query data from a user, wherein the query data comprises a query input of the query and metadata of the query.

4. The method of claim 3, wherein generating contextual data comprises:

determining historical activity data for the user using the metadata; and generating the contextual data using the historical activity data.

5. The method of claim 3, wherein generating the engagement feature comprises:

generating the engagement feature using the query input and the metadata.

6. The method of claim 1, wherein generating the plurality of distributions comprises:

generating a distribution of the plurality of distributions for the new widget in the widget slot, wherein the distribution has a mean of a ranking score for the new widget in the widget slot and a standard deviation of a ranking uncertainty for the new widget in the widget slot.

7. The method of claim 1, wherein determining the reward data using the relevance score comprises:

determining the reward data based on a placement of an assigned widget slot in the plurality of widget slots.

8. A system comprising:

at least one memory device; and a processing device, operatively coupled with the at least one memory device, to:

based on received query data, generate contextual data for a plurality of widgets and a plurality of widget slots, wherein the plurality of widget slots comprises locations in a graphical user interface that are assigned to the plurality of widgets and the contextual data comprises ranking scores and ranking uncertainties for the plurality of widgets;

generate a plurality of distributions for the plurality of widgets using the ranking scores and ranking uncertainties for the plurality of widgets;

create a plurality of sampled rankings for the plurality of widgets by sampling the plurality of distributions;

generate feature vectors for a new widget of the plurality of widgets using the plurality of sampled rankings;

train a machine learning ranking model using the feature vectors, wherein the machine learning ranking model comprises a plurality of model weights for the plurality of widget slots;

retrieve the plurality of model weights for the plurality of widget slots;

compute a plurality of expected rewards and reward uncertainties for the plurality of model weights;

apply the machine learning ranking model to the plurality of widgets including the new widget, wherein the applying comprises ranking the plurality of widgets based on the plurality of expected rewards and reward uncertainties;

cause presentation of the new widget in the graphical user interface via a widget slot of the plurality of widget slots determined using the plurality of model weights of the machine learning ranking model; and receive reward data via the graphical user interface in response to the presentation of the new widget via the widget slot determined using the plurality of model weights of the machine learning ranking model, wherein receiving the reward data comprises:

receiving, from the graphical user interface, a relevance score for the presentation of the new widget in the widget slot based on a user interaction with the new widget;

determining the reward data using the relevance score; and updating a model weight of the plurality of model weights for the new widget based on the reward data.

9. The system of claim 8, wherein the processing device is further to:

generate an engagement feature for the new widget using the query data, wherein the feature vectors include the engagement feature.

10. The system of claim 9, wherein the processing device is further to:

receive a query including the query data from a user, wherein the query data comprises a query input of the query and metadata of the query.

11. The system of claim 10, wherein the processing device is further to:

determine historical activity data for the user using the metadata; and generate the contextual data using the historical activity data.

12. The system of claim 10, wherein the processing device is further to:

generate the engagement feature using the query input and the metadata.

13. The system of claim 8, wherein generating the plurality of distributions comprises:

generating a distribution of the plurality of distributions for the new widget in the widget slot, wherein the distribution has a mean of a ranking score for the new widget in the widget slot and a standard deviation of a ranking uncertainty for the new widget in the widget slot.

14. A non-transitory computer readable medium comprising instructions that when executed by a processing device cause the processing device to:

based on received query data, generate contextual data for a plurality of widgets and a plurality of widget slots, wherein the plurality of widget slots comprises locations in a graphical user interface that are assigned to the plurality of widgets and the contextual data comprises ranking scores and ranking uncertainties for the plurality of widgets;

generate a plurality of distributions for the plurality of widgets using the ranking scores and ranking uncertainties for the plurality of widgets;

create a plurality of sampled rankings for the plurality of widgets by sampling the plurality of distributions;

generate feature vectors for a new widget of the plurality of widgets using the plurality of sampled rankings;

train a machine learning ranking model using the feature vectors, wherein the machine learning ranking model comprises a plurality of model weights for the plurality of widget slots;

retrieve the plurality of model weights for the plurality of widget slots;

compute a plurality of expected rewards and reward uncertainties for the plurality of model weights;

apply the machine learning ranking model to the plurality of widgets including the new widget, wherein the applying comprises ranking the plurality of widgets based on the plurality of expected rewards and reward uncertainties;

cause presentation of the new widget in the graphical user interface via a widget slot of the plurality of widget slots determined using the plurality of model weights of the machine learning ranking model; and receive reward data via the graphical user interface in response to the presentation of the new widget via the widget slot determined using the plurality of model weights of the machine learning ranking model, wherein receiving the reward data comprises:

receiving, from the graphical user interface, a relevance score for the presentation of the new widget in the widget slot based on a user interaction with the new widget;

determining the reward data using the relevance score; and updating a model weight of the plurality of model weights for the new widget based on the reward data.

15. The non-transitory computer readable medium of claim 14, wherein the instructions when executed by the processing device further cause the processing device to:

determine the reward data based on a placement of an assigned widget slot in the plurality of widget slots.

\* \* \* \* \*